United States Patent
Cao et al.

(10) Patent No.: US 9,460,087 B2
(45) Date of Patent: Oct. 4, 2016

(54) PARAMETER ADJUSTMENT METHOD USED FOR STATISTICAL MACHINE TRANSLATION

(71) Applicant: Harbin Institute of Technology, Harbin, Heilongjiang Province (CN)

(72) Inventors: Hailong Cao, Harbin (CN); Wenwen Zhang, Harbin (CN); Lemao Liu, Harbin (CN); Tiejun Zhao, Harbin (CN); Muyun Yang, Harbin (CN); Dequan Zheng, Harbin (CN); Conghui Zhu, Harbin (CN); Bing Xu, Harbin (CN)

(*) Notice: Subject to any disclaimer, the term of this patent is extended or adjusted under 35 U.S.C. 154(b) by 0 days.

(21) Appl. No.: 14/763,505

(22) PCT Filed: Dec. 2, 2013

(86) PCT No.: PCT/CN2013/088284
§ 371 (c)(1),
(2) Date: Jul. 25, 2015

(87) PCT Pub. No.: WO2014/114140
PCT Pub. Date: Jul. 31, 2014

(65) Prior Publication Data
US 2016/0004691 A1    Jan. 7, 2016

(30) Foreign Application Priority Data
Jan. 25, 2013 (CN) .......................... 2013 1 0029538

(51) Int. Cl.
*G06F 17/28* (2006.01)
(52) U.S. Cl.
CPC ......... *G06F 17/2818* (2013.01); *G06F 17/289* (2013.01); *G06F 17/2827* (2013.01); *G06F 17/2836* (2013.01)
(58) Field of Classification Search
CPC .......... G06F 17/2818; G06F 17/2827; G06F 17/2836; G06F 17/289
USPC ........................................ 704/2, 3, 4, 5, 277
See application file for complete search history.

*Primary Examiner* — Thierry L Pham
(74) *Attorney, Agent, or Firm* — Novoclaims Patent Services LLC; Mei Lin Wong

(57) ABSTRACT

The present invention relates to a parameter adjustment method. The parameter adjustment method used for statistical machine translation comprises: step 1: using a monolingual corpus to construct a language model required for translation; step 2: using a bilingual parallel corpus to construct a translation model; and step 3: using a target function to adjust a parameter. The method can solve problems in prior art that the parameter is easily over-fit or falls into a local optimum during a parameter adjustment process, and the method is easy to implement and can combine a larger number of features. In addition, the target function is convex; therefore, global optimum can be achieved in a training process.

4 Claims, 1 Drawing Sheet

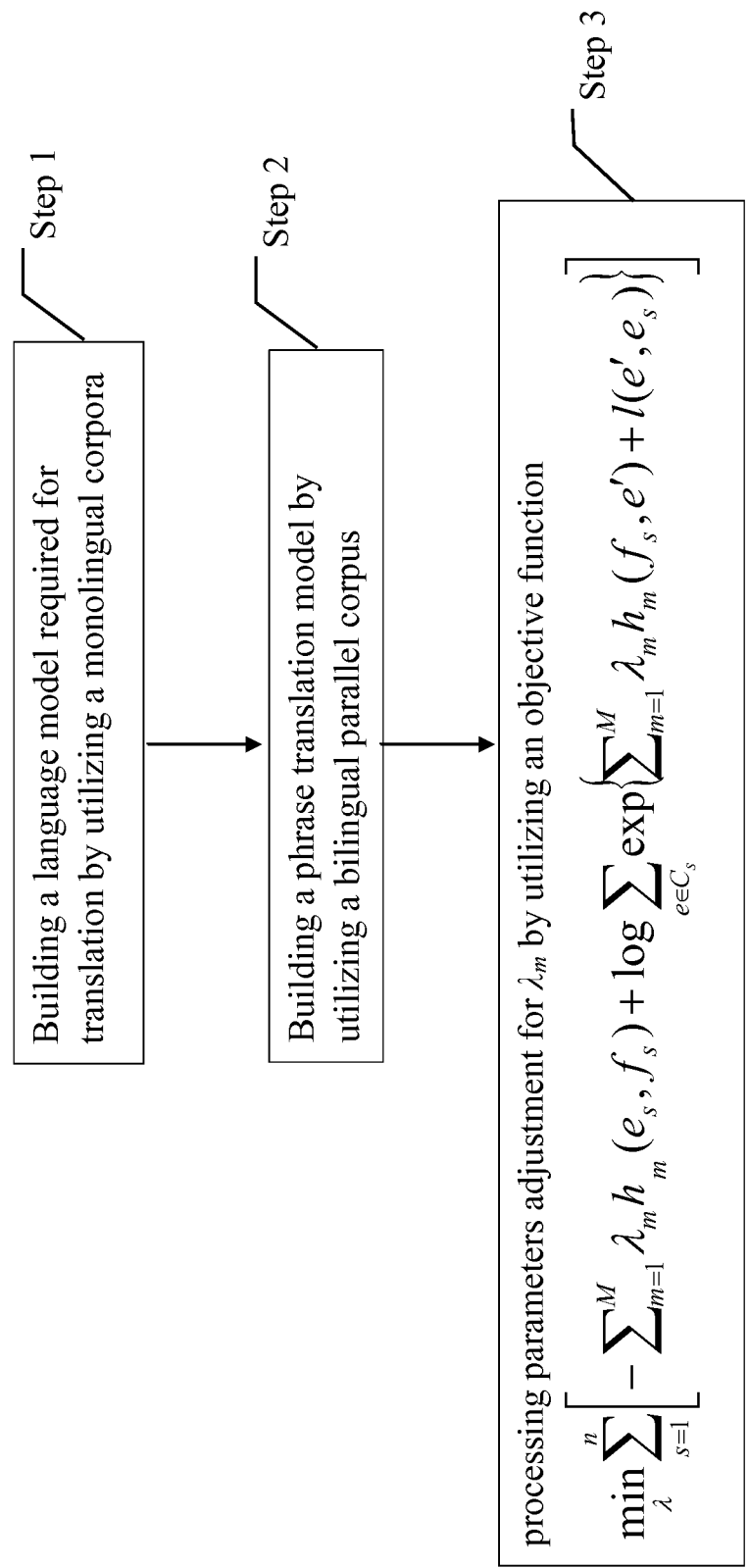

PARAMETER ADJUSTMENT METHOD USED FOR STATISTICAL MACHINE TRANSLATION

CROSS REFERENCE OF RELATED APPLICATION

This is a national phase national application of an international patent application number PCT/CN2013/088284 with a filing date of Dec. 2, 2013, which claimed priority of one foreign application which is filed in China: application number 201310029538.0 and filing date Jan. 25, 2013. The contents of these specifications, including any intervening amendments thereto, are incorporated herein by reference.

BACKGROUND OF THE PRESENT INVENTION

1. Field of Invention

The present invention relates to a method of parameters adjustment.

2. Description of Related Arts

With the rapid development of internet and in-depth economic globalization, interpersonal communications between different nations is more and more frequent. Language issues become the barrier which restricts the free communications between people. In order to use our national language for barrier-free communications with the world, more and more extensive demand for translation services is needed.

Written or spoken manual translation by human operator may not only be time consuming, but also costly. The object of machine translation is to achieve an automated translation from one language to another language. At present, a variety methods of machine translation are existed, which includes machine translation based on actual usage examples and machine translation based on statistical data. Wherein the current mainstream method is machine translation based on statistical data. For a given particular sentence in source language, machine translation based on statistical data will try to search for the best possible translation sentence in target language. Assume f refers to source language and e refers to target language, machine translation will try to find the e as follows:

$$\arg\max_{e} P(e|f);$$

in other words, among all possible translation sentence, the translation with the greatest P (e|f) is selected. In the conventional log-linear model, by introducing characteristics and weights, the factorization of P (e|f) is:

$$P(e|f) = \frac{\exp[\Sigma_{m=1}^{M} \lambda_m h_m(e, f)]}{\Sigma_{e'} \exp[\Sigma_{m=1}^{M} \lambda_m h_n(e', f)]},$$

where $\lambda_m$ refers to weights, $h_m$ (e,f) refers to characteristics functions, common characteristics functions includes language model, translation model, sequence model and correctional word penalty items.

The training process of a translation system is a process of searching the optimal solution for the parameter $\lambda_m$, m= 1, ..., M. In this regard, many parameters optimization methods are developed, and that the most widely employed method is Minimum Error Rate Training, MERT in which the optimization criteria is:

$$\hat{\lambda}_1^M = \arg\min_{\lambda_1^M}\left\{\sum_{s=1}^{S} E(r_s, \hat{e}(f_s; \lambda_1^M))\right\};$$

in other words, the target of MERT is to locate the parameter $\lambda_m$, m=1, ..., M, such that the error rate of the training set in the translation system is the minimum.

During the process of parameters tuning in MERT, the final translation performance is considered directly, therefore a better result is obtained. Nevertheless, there are still some deficiencies in MERT. For examples, in the optimization criteria, regularization term is not used and parameters overfitting is easily caused. Also, the support to large-scale characteristics in MERT is not good. On the other hand, since the objective function in MERT is not convex in nature, MERT requires multiple initialization values for preventing the local minimum and this increases the complexity of calculation.

For parameters tuning, in addition to the above mentioned Minimum Error Rate Training MERT, online (online) training algorithm is another training method which is based on the greatest margin (margin) and conditional likelihood, CL (conditional likelihood, CL).

Even though the training method which is based on the greatest margin and conditional likelihood can resolve the problem of parameters training to a certain extent, both have their own deficiencies. In particular, in the training method which is based on the greatest margin, the objective function is not convex in nature, therefore the problem of local minimum is easily caused and it is difficult to obtain the optimal solution. In the training method which is based on conditional likelihood, the problems of local minimum is solved. However, cost functions is not integrated in the objective functions. Therefore the optimization process cannot be processed on the training set directly and the valid model parameters cannot be obtained.

SUMMARY OF THE PRESENT INVENTION

An object of the present invention is to solve the problem of overfitting phenomenon and local optimization problem during parameters tuning by providing a method of parameter adjustment method for use in statistical machine translation.

According to the parameter adjustment method for statistical machine translation of the present invention, the steps are as follows:

Step 1: building a language model for translation by using a monolingual corpora;

Step 2: building a phrase translation model by using a bilingual parallel corpus;

Step 3: processing parameters adjustment for $\lambda_m$ by objective function $$\min_{\lambda} \sum_{s=1}^{n}\left[-\Sigma_{m=1}^{M}\lambda_m h_m(e_s, f_s) + \log\sum_{e' \in C_s} \exp\{\Sigma_{m=1}^{M}\lambda_m h_m(f_s, e') + l(e', e_s)\}\right],$$

where es refers to reference translation, e' refers to machine translation, fs refers to sentence in source language awaiting for translation processing, $h_m(e_s,f_s)$ and $h_m(f_s,e')$ refers to the characteristics used in building the translation system, the characteristics comprises four main categories, which are language model, phrase translation listing, sequence model and correctional word penalty items, $m=1, \ldots, M$, M refers to the total number of characteristics, $l(e', e_s)$ refers to cost function, $C_5$ refers to the collection of machine translation candidate, $e' \in C_5$.

Parameters adjustment is a very important aspect in the process of building a translation system. The quality of parameters will directly affect the translation performance of the final system. If the parameters adjustment is poorly processed, the final translation quality will be reduced significantly.

According to the present invention, regularization term (such as $$c\sum_{m=1}^{M}\lambda_m^2)$$

is added in the objective functions to prevent the occurrence of overfitting phenomenon in the optimization and solving process. In additional, compared to MERT, the objective functions of the present invention is a convex function and thus the optimal solution being obtained does not rely on the initial assignment; at the same time, since many effective methods for solving convex function are available, it becomes relatively easy to solve the original optimization problem; furthermore, the regularization term is added, therefore more characteristics can be combined when compared to MERT while the overfitting problems of parameters can be prevented.

One very important problem in machine translation is that during the parameter adjustment process, whether gold standard is required in the method of optimization. According to the present invention, the gold standard is required. Since during the decoding process, this type of translation cannot be obtained and thus there is a need to find an alternative solution. According to the present invention, the alternative solution for replacing gold standard translation is utilizing the translation with the highest BLEU score under the current model parameters.

Another question is how to select the form of cost function. Different cost function may have a different effect on the final translation result. For translation sentence with poor translation quality, a relative greater penalty should be applied. To address this problem, the inverse score of BLEU is used as cost function.

The method of the present invention is easily realized and is capable of preventing the overfitting phenomenon during the parameters adjustment process while a greater number of characteristics can be combined. In addition, since the objective function is a convex function, the overall optimal solution in the training process can also be obtained.

BRIEF DESCRIPTION OF THE DRAWINGS

FIG. 1 is the flow diagram of a method of parameters adjustment in statistical machine translation according to the embodiment 1 of the preferred embodiment of the present invention.

DETAILED DESCRIPTION OF THE PREFERRED EMBODIMENT

The preferred embodiment of the present invention is further described and includes all combinations and modifications encompassed within the spirit and scope of the followings.

Embodiment 1

The parameter adjustment method for statistical machine translation according to the preferred embodiment of the present invention comprises the following steps:

Step 1: building a language model for translation by using a monolingual corpora;

Step 2: building a phrase translation model by using a bilingual parallel corpus;

Step 3: processing parameters adjustment for $\lambda_m$ by utilizing an objective function $$\min_{\lambda} \sum_{s=1}^{n} \left[ -\Sigma_{m=1}^{M}\lambda_m h_m(e_s, f_s) + \log \sum_{e \in C_s} \exp\{\Sigma_{m=1}^{M}\lambda_m h_m(f_s, e') + l(e', e_s)\} \right],$$

where $e_s$ refers to reference translation, e' refers to machine translation, fs refers to sentence in source language awaiting for translation processing, $h_m(e_s,f_s)$ and $h_m(f_s,e')$ refer to the characteristics used in building the translation system, the characteristics comprises four main categories, which are language model, phrase translation listing, sequence model and correctional word penalty items, $m=1, \ldots, M$, M refers to the total number of characteristics, $l(e', e_s)$ refers to cost function, $C_5$ refers to the collection set of machine translation candidate, $e' \in C_5$.

Embodiment 2: According to this preferred embodiment, in the step 3 of the embodiment 1, further limitation is included in the $l(e', e_s)$ of the objective function. In the objective function of step 3, $$l(e', e_s) = -BP(e', e_s) * \exp\left(\sum_{n=1}^{N} \frac{\log p_n}{N}\right),$$

where $BP(e', e_s)$ refers to penalty factor for length, that penalty is given to a sentence having a shorter length than the reference translation, $p_n$ refers to N-gram accuracy in N-gram for representing the proportion of matching between the n-gram phrases in machine translation and n-gram reference translation, N refers to the maximum order used in N-gram.

Embodiment 3: According to this preferred embodiment, in the step 3 of the embodiment 1, further limitation is included in the selection of the $e_s$ of the objective function. In the objective function of step 3, the selection method of $e_s$ includes the steps of:

Step A: for each sentence in the $e_s$ collection set, utilizing one 9-dimensional array of integers to store its linguistic information $A=[a_0, a_1, \ldots, a_7, a_8]$;

Step B: if any one of $a_0, a_2, a_4, a_6$ equals to 0, then the score for the sentence is: score=0; otherwise, $$\text{record sum} = \sum_{i=0}^{3} (\log a_{2i} - \log a_{2i+1})/4;$$

Step C:

$$\text{calculating temp} = 1 - \frac{a_8}{a_1};$$

if temp <0, then the score for the sentence is: score=sum+temp; otherwise, score=sum;

Step D: selecting the sentence with the highest score ê to replace $e_s$ from $C_5$ collection set.

Embodiment 4: According to this preferred embodiment, in the step 3 of the embodiment 1, further limitation is included in the solving process of the objective function. In the objective function of step 3, the solving process of the objective function comprises the steps of:

Step a: finding the partial derivative for each parameters in the objective functions and obtaining $$\frac{\partial}{\partial \lambda_k} =$$

$$\sum_{s=1}^{n} \left[ -h_k(f_s, e_s) + \sum_{e' \in C_s} \frac{\exp\{\Sigma_{m=1}^{M} \lambda_m h_m(f_s, e') + l(e', e_s)\}}{\Sigma_{e' \in C_s} \exp\{\Sigma_{m=1}^{M} \lambda_m h_m(f_s, e') + l(e', e_s)\}} h_k(f_s, e') \right];$$

Step b: initializing $\lambda_m$, m=1, ..., M, a random value between [−1, 1], then according to the formula in the step a, for the partial derivative for each parameter, calculating the reciprocal value $\delta_m$, m=1, ..., M, M refers to the total number of characteristics;

Step c: updating the value of $\lambda_m$, $\hat{\lambda}_m = \lambda_m - \alpha \delta_m$, m=1, ..., M;

Step d: repeating step b and step c until $|\hat{\lambda}_m - \lambda_m| < 10-5$, m=1, ..., M.

What is claimed is:

1. A parameters adjustment method in a statistical machine translation for a computing machine, characterized in that, the method comprises the following steps:

Step 1: building a language model required for translation by utilizing a monolingual corpora with a processor of a computing machine;

Step 2: building a phrase translation model by utilizing a bilingual parallel corpus with the processor of the computing machine;

Step 3: the processor of the computing machine processing parameters adjustment for $\lambda_m$ by utilizing an objective function $$\min_{\lambda} \sum_{s=1}^{n} \left[ -\Sigma_{m=1}^{M} \lambda_m h_m(e_s, f_s) + \log \sum_{e \in C_s} \exp\{\Sigma_{m=1}^{M} \lambda_m h_m(f_s, e') + l(e', e_s)\} \right],$$

where $e_s$ refers to reference translation, e' refers to machine translation, fs refers to sentence in source language awaiting for translation processing, $h_m(e_s, f_s)$ and $h_m(f_s, e')$ refer to the characteristics used in building the translation system, the characteristics comprises four main categories, which are language model, phrase translation listing, sequence model and correctional word penalty items, m=1, ..., M, M refers to the total number of characteristics, $l(e', e_s)$ refers to cost function, $C_5$ refers to the collection set of machine translation candidate, e' ∈ $C_5$.

2. The parameters adjustment method in a statistical machine translation, according to claim 1, characterized in that, in the objective function of the step 3, $$l(e', e_s) = -BP(e', e_s) * \exp\left(\sum_{n=1}^{N} \frac{\log p_n}{N}\right),$$

where BP(e', $e_s$) refers to penalty factor for length, that penalty is given to a sentence having a shorter length than the reference translation, $p_n$, refers to N-gram accuracy in N-gram for representing the proportion of matching between the n-gram phrases in machine translation and n-gram reference translation, N refers to the maximum order used in N-gram.

3. The parameters adjustment method in a statistical machine translation, according to claim 1, characterized in that, the $e_s$ of the objective function further comprises a selection process which comprise the steps of:

Step A: for each sentence in the $e_s$ collection set, the processor of the computing machine utilizing one 9-dimensional array of integers to store its linguistic information A=[$a_0$, $a_1$, ..., $a_7$, $a_8$];

Step B: if any one of $a_0$, $a_2$, $a_4$, $a_6$ equals to 0, then the score for the sentence is: score=0; otherwise, $$\text{record sum} = \sum_{i=0}^{3} (\log a_{2i} - \log a_{2i+1})/4;$$

Step C: the processor of the computing machine $$\text{calculating temp} = 1 - \frac{a_8}{a_1};$$

if temp <0, then the score for the sentence is: score=sum+temp; otherwise, score=sum;

Step D: the processor of the computing machine selecting the sentence with the highest score ê to replace $e_s$ from $C_5$ collection set.

4. The parameters adjustment method in a statistical machine translation, according to claim 1, characterized in that, the objective function has a solving process which comprises the steps of:

Step a: the processor of the computing machine finding the partial derivative for each parameters in the objective functions and obtaining $$\frac{\partial}{\partial \lambda_k} =$$

$$\sum_{s=1}^{n} \left[ -h_k(f_s, e_s) + \sum_{e' \in C_s} \frac{\exp\{\Sigma_{m=1}^{M} \lambda_m h_m(f_s, e') + l(e', e_s)\}}{\Sigma_{e' \in C_s} \exp\{\Sigma_{m=1}^{M} \lambda_m h_m(f_s, e') + l(e', e_s)\}} h_k(f_s, e') \right];$$

Step b: the processor of the computing machine initializing $\lambda_m$, m=1, ..., M, a random value between [−1, 1], then according to the formula in the step a, for the partial derivative for each parameter, calculating the reciprocal value $\delta_m$, m=1, ..., M, M refers to the total number of characteristics;

Step c: the processor of the computing machine updating the value of $\lambda_m$, $\hat{\lambda}_m = \lambda_m - \alpha \delta_m$, m=1, ..., M;

Step d: the processor of the computing machine repeating step b and step c until $|\hat{\lambda}_m - \lambda_m| < 10-5$, m=1, ..., M.

* * * * *